United States Patent Office.

ANTONIO SOLARI, OF LOUISVILLE, KENTUCKY, ASSIGNOR OF ONE-HALF HIS RIGHT TO FRANCIS MAGUET, OF SAME PLACE.

Letters Patent No. 111,395, dated January 31, 1871.

IMPROVEMENT IN COMPOSITIONS FOR FLOORS, PAVEMENTS, &c.

The Schedule referred to in these Letters Patent and making part of the same.

I, ANTONIO SOLARI, of the city of Louisville, county of Jefferson and State of Kentucky, have invented a certain new and useful Improvement in a Composition for making Floors and Pavements, of which the following is a specification.

The nature of this invention consists in pulverized soft brick, three parts, common lime, one part, mixed together with water to about the consistency of mortar, after which it is applied to the floor or pavement from two and one-half to four inches thick, and when sufficiently dry a second coating is applied, consisting of pulverized marble, one-third part, and common lime, two-thirds, also mixed with water, to about the consistency of mortar, after which it is spread over the last-named coating, forming another coat of about one-quarter to one-half inch thick, and, while yet soft, small pieces of different-colored marble or other kind of colored stones are imbedded in the surface, forming any kind of figures or designs, after which they are all pressed down, so as to present an even surface, and, when fully dry, the whole is ground or polished smooth by means of a large stone and water, similar to the process now used in polishing stone or marble, after which it is thoroughly cleansed with water, and, when perfectly dry, the surface is varnished with a composition consisting of linseed-oil, spirits of turpentine, and spirits of wine in equal parts, all boiled together for one hour, when it is set aside, and, when cold, is applied with an ordinary paint-brush; therefore

What I claim as my invention, and desire to secure by Letters Patent, is—

The composition-floor or pavement described in the above specification, consisting of the ingredients in the proportions and for the purpose set forth.

ANTONIO SOLARI.

Witnesses:
C. HEWITT,
E. F. HUYCK.